United States Patent [19]
Tucek

[11] Patent Number: 5,188,380
[45] Date of Patent: Feb. 23, 1993

[54] GENERAL UTILITY CHILD SEAT APPARATUS

[76] Inventor: Kevin B. Tucek, 6442 S. Holland Ct., Littleton, Colo. 80123

[21] Appl. No.: 744,444

[22] Filed: Aug. 13, 1991

[51] Int. Cl.⁵ .............................................. B62B 7/12
[52] U.S. Cl. .................................... 280/30; 5/416; 135/88; 280/47.38; 280/643; 280/647; 280/658; 297/183; 297/184; 403/102
[58] Field of Search .............. 280/30, 47.38, 641, 280/642, 643, 647, 650, 657, 658; 297/DIG. 4, 183, 184; 16/112, 332; 5/416, 413; 403/92, 102; 135/90, 88

[56] References Cited

U.S. PATENT DOCUMENTS

| | | | |
|---|---|---|---|
| 1,126,236 | 1/1915 | Lees | 5/416 |
| 1,412,935 | 4/1922 | Greenebaum | 5/416 |
| 2,706,993 | 4/1955 | Forrest | 5/416 |
| 3,689,099 | 9/1972 | Patterson | 280/642 |
| 4,191,397 | 3/1980 | Kassai | 280/650 |
| 4,577,877 | 3/1986 | Kassai | 280/642 |
| 4,685,688 | 8/1987 | Edwards | 280/658 |
| 4,786,064 | 11/1988 | Baghdasarian | 280/30 |
| 4,828,281 | 5/1989 | Sanchas | 280/30 |
| 4,832,354 | 5/1989 | LaFreniere | 280/30 |
| 4,872,692 | 10/1989 | Steenburg | 280/30 |
| 4,872,693 | 10/1989 | Kennel | 280/47.38 |
| 4,874,182 | 10/1989 | Clark | 280/643 |
| 4,896,894 | 1/1990 | Singletary | 280/30 |
| 4,953,887 | 9/1990 | Takahashi et al. | 280/647 |
| 4,989,888 | 2/1991 | Qureshi et al. | 280/30 |
| 4,997,231 | 3/1991 | Smith | 297/184 |

FOREIGN PATENT DOCUMENTS

| | | | |
|---|---|---|---|
| 1076985 | 11/1954 | France | 297/184 |
| 2168297 | 6/1986 | United Kingdom | 280/642 |

*Primary Examiner*—Eric D. Culbreth
*Attorney, Agent, or Firm*—John R. Flanagan

[57] ABSTRACT

A general utility child seat apparatus includes a one-piece contoured child car seat, a mobile carriage assembly, a handle assembly, and a sunshade assembly adapting the child seat apparatus for multiple uses, for instance, as a stroller, carrier, or rocker, in addition to a car seat. The child seat is a contoured body of one-piece rigid molded structure, having a seat portion and back portion integrally formed in an inclined relation to the seat portion. The mobile carriage assembly is mounted to a rear side of the body and is capable of adjustment between an erected condition for movably supporting the body and a collapsed condition for storing on the body. The handle assembly and sunshade assembly are pivotally mounted about a common axis to opposite sides of the body and have inverted U-shaped configurations permitting them to arch over the body.

15 Claims, 6 Drawing Sheets

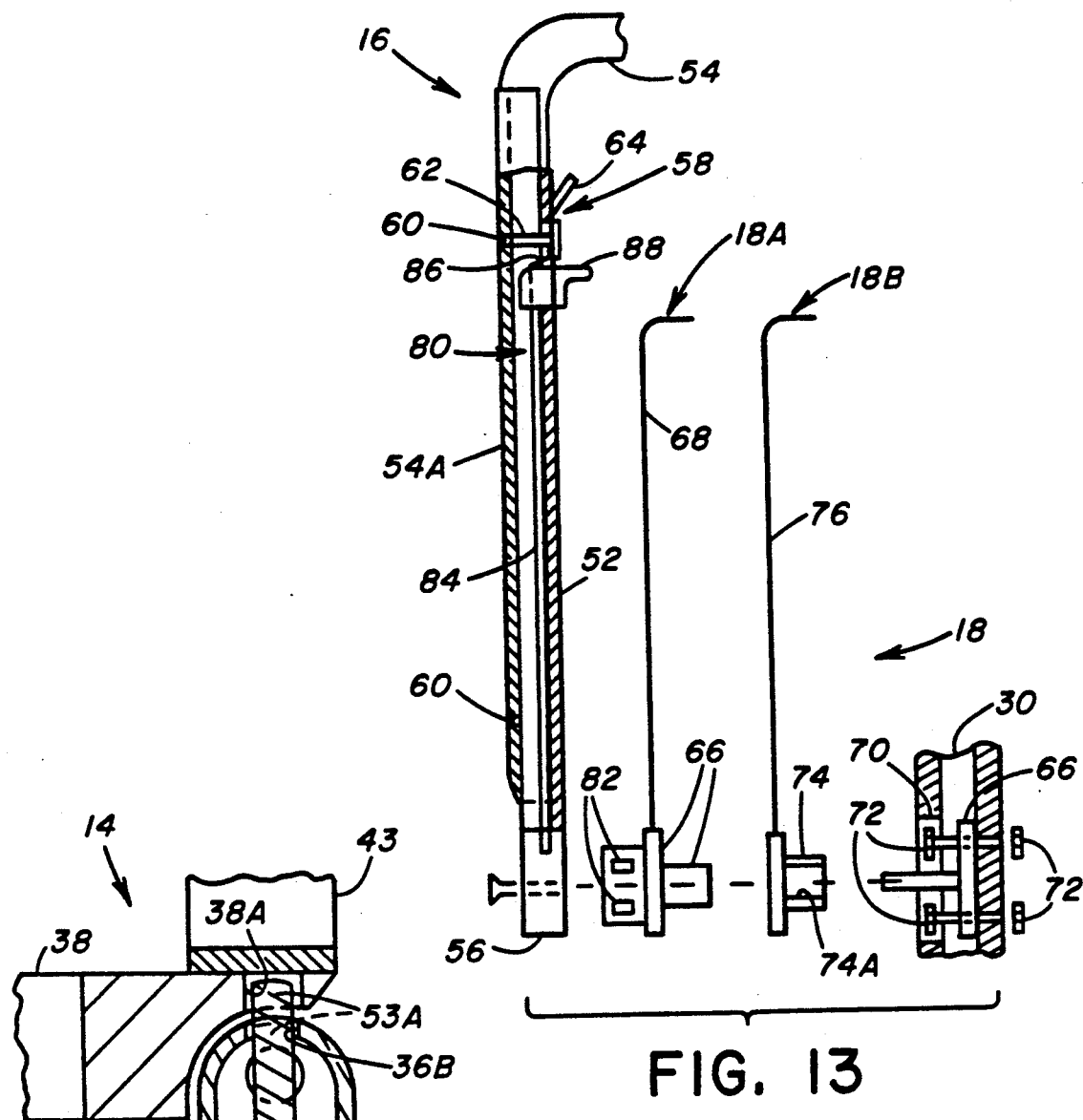
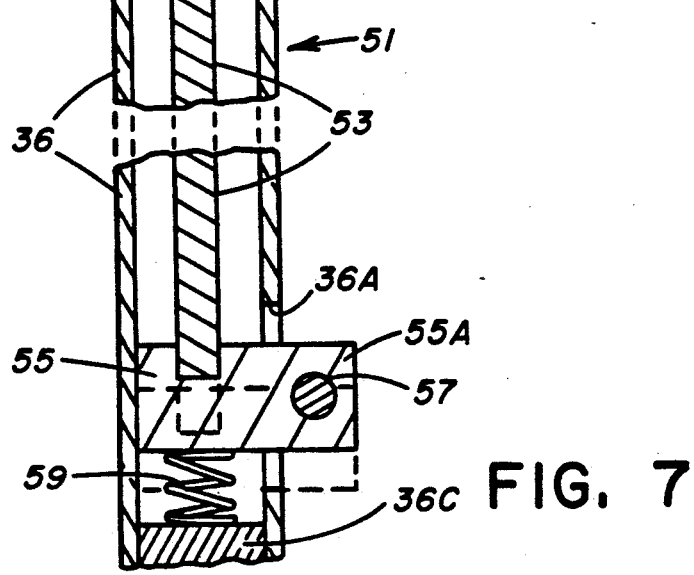
FIG. 13
FIG. 7

GENERAL UTILITY CHILD SEAT APPARATUS

BACKGROUND OF THE INVENTION

1. Field of the Invention

The present invention generally relates to seating apparatus for small children convertible between multiple uses and, more particularly, is concerned with a general utility child seat apparatus which utilizes independent carriage, handle, and sunshade assemblies in conjunction with a car seat to adapt the child seat apparatus for multiple uses.

2. Description of the Prior Art

The traditional practice has been that different activities of adults accompanied by small children require the use of different accessories for holding the child. For instance, in many jurisdictions, traveling in a vehicle with a small child requires the use of a car seat for securely holding the child. Walking with a small child typically requires the use of a stroller or a carrier for transporting the child. Comforting a small child may require the use of a rocker for seating the child.

This traditional practice has several drawbacks. One drawback is that the employment of different accessories for each different activity is costly in terms of the money that has to be expended to purchase the accessories. Another drawback is that storage of the different accessories takes up scarce space both in the home and vehicle.

Convertible or multiple use child seat apparatuses have been proposed in the prior patent art for alleviating these drawbacks. Representative of the prior patent art are the apparatuses disclosed in U.S. Pat. No. 4,786,064 to Baghdasarian, U.S. Pat. No. 4,828,281 to Sanchas, U.S. Pat. No. 4,832,354 to LaFreniere, U.S. Pat. No. 4,872,692 to Steenburg, U.S. Pat. No. 4,896,894 to Singletary, and U.S. Pat. No. 4,989,888 to Qureshi et al.

U.S. Pat. No. 4,786,064 to Baghdasarian discloses a child seat that converts from a car seat to a stroller, rocker, or carrier. The seat has a wheel frame assembly collapsible along the exterior of the seat and a handle pivoted to opposite side panels of the seat. The handle telescopically retracts when the seat is used as a car seat. Multiple locking positions are provided for the handle so that it may be used as a lifting handle. This allows the seat to be used as a portable carrier.

U.S. Pat. No. 4,828,281 to Sanchas discloses a convertible car seat stroller having upper and lower portions secured together by latches. The upper portion has a padded seat. A wheel frame is enclosed by the lower portion. U.S. Pat. No. 4,832,354 to LaFreniere discloses a convertible carrier adjustable to car seat and stroller configurations and having a telescoping handle. The carrier is a contoured shell. U.S. Pat. No. 4,872,692 to Steenburg discloses a wheeled carriage or stroller having retractible wheels.

U.S. Pat. No. 4,896,894 to Singletary discloses a stroller car seat having a scissor-like underlying framework with pivotally mounted wheels at the corners of the framework. U.S. Pat. No. 4,989,888 to Qureshi et al discloses a combination child restraint (or car) seat and stroller. The wheels are stowed in the bottom of the seat. An extendible and retractable handle is mounted along the rear of the seat.

Of all the these prior art constructions, the child seat apparatus of Baghdasarian seems to be the most versatile by being convertible from a car seat to a stroller, rocker, or carrier. However, even this prior art apparatus appears to have several limiations. It seems to be overly complicated in its construction and number of parts and thus is probably costly to manufacture and awkward to use.

Consequently, a need still exists for a child seat apparatus of general utility or adaptability which avoids the limitations and drawbacks of the prior art.

SUMMARY OF THE INVENTION

The present invention provides a general utility child seat apparatus designed to satisfy this need. The general utility child seat apparatus utilizes features in the form of a mobile carriage assembly, a handle assembly, and a sunshade assembly, which are independent of one another. These different assemblies in conjunction with a one-piece contoured child car seat body adapt the child seat apparatus for multiple uses.

The child seat apparatus incorporating the features of the present invention includes a child seat body, a mobile carriage assembly, and a handle assembly. The child seat body has a seat portion and back portion integrally formed in an inclined relation to the seat portion. The mobile carriage assembly is mounted to a rear side of the body and is capable of adjustment between an erected condition for movably supporting the body and a collapsed condition for storage on the body. The handle assembly is attached to opposite sides of the child seat body.

In accordance with one feature of the present invention, the mobile carriage assembly of the child seat apparatus has a base, pairs of front and rear legs, and a plurality of rotatable wheels mounted on the lower ends of the front and rear legs. The base is stationarily mounted to the rear side of the seat portion of the body. The base includes a pair of laterally spaced side members, and a front member extending between and rigidly connected with the side members. The upper ends of the front legs are pivotally attached to the front ends of the base side members. The upper ends of the rear legs are pivotally attached to the rear ends of the base side members.

The mobile carriage assembly also includes a front transverse member in the form of a front tie rod extending between and interconnecting the front legs for causing the front legs to pivot together in unison between erected and collapsed positions relative to the base. The mobile carriage assembly also includes a rear transverse member in the form of a rear tie rod extending between and interconnecting the rear legs for causing the rear legs to pivot together in unison between erected and collapsed positions relative to the base. The mobile carriage assembly further includes first and second longitudinal members pivotally connected with the respective front and rear legs and disposed along respective opposite sides of the base for causing the front and rear legs to pivot together in unison between erected and collapsed positions relative to the base. The first and second longitudinal members extend parallel to and are spaced apart from one another. The longitudinal members are bifurcated for receiving in nested relation the lower ends of the front legs and the wheels mounted thereon when the front and rear legs are pivoted to the collapsed position. The side members of the base have slots through which the wheels on the front legs extend when the front and rear legs are pivoted to the collapsed position.

In accordance with another feature of the present invention, the handle assembly of the child seat apparatus includes a pair of inner members pivotally attached at inner ends to opposite sides of the child seat body, and an outer member of an inverted U-shaped configuration slidably connected to the inner members such that the outer member is longitudinally extendible and retractible relative to the inner members and the handle assembly can arch over the seat and back portions of the child seat body. The handle assembly also includes means for releasably retaining the inner members in any one of a number of angular positions relative to the sides of the child seat body, and means for releasably locking the outer member to the inner members in any one of a number of longitudinally displaced positions relative to the inner members to adjust the desired length of the handle assembly.

In accordance with a further feature of the present invention, the sunshade assembly of the child seat apparatus includes a sunshade assembly pivotally mounted at opposite sides of the child seat body about a common axis with the handle assembly and between the handle assembly and the opposite sides of the child seat body. Both the handle assembly and sunshade assembly have inverted U-shaped configurations for permitting them to arch over the child seat body. More particularly, the sunshade assembly includes a rear portion having a pair of first hubs mounted stationarily to the opposite sides of the child seat body and a generally U-shaped rear bow attached at opposite ends to the first hubs, and a front portion having a pair of second hubs rotatably mounted to the first hubs and a generally U-shaped front bow attached at opposite ends to the second hubs for pivotal movement relative to the rear bow upon rotation of the second hubs relative to the first hubs. The sunshade assembly also includes a flexible canopy extending between, overlying, and attached to, the rear and front bows, and a series of bow segments attached to the canopy at transverse locations thereon spaced from one another and located between the front and rear bows. The canopy and bow segments are deployable in an expanded condition for providing coverage of the child seat body when the front bow is pivoted away from the rear bow and in a contracted condition when the front bow is pivoted toward the rear bow.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawing in which:

FIG. 7 is an enlarged fragmentary longitudinal sectional view taken along line 7—7 of FIG. 2, showing a latched relationship between one of the rear legs and a corresponding one of the base side members of the carriage assembly.

FIG. 13 is an fragmentary exploded view of the handle and sunshade assembly of the child seat apparatus of FIG. 9.

DETAILED DESCRIPTION OF THE PREFERRED EMBODIMENT

Figure 1:
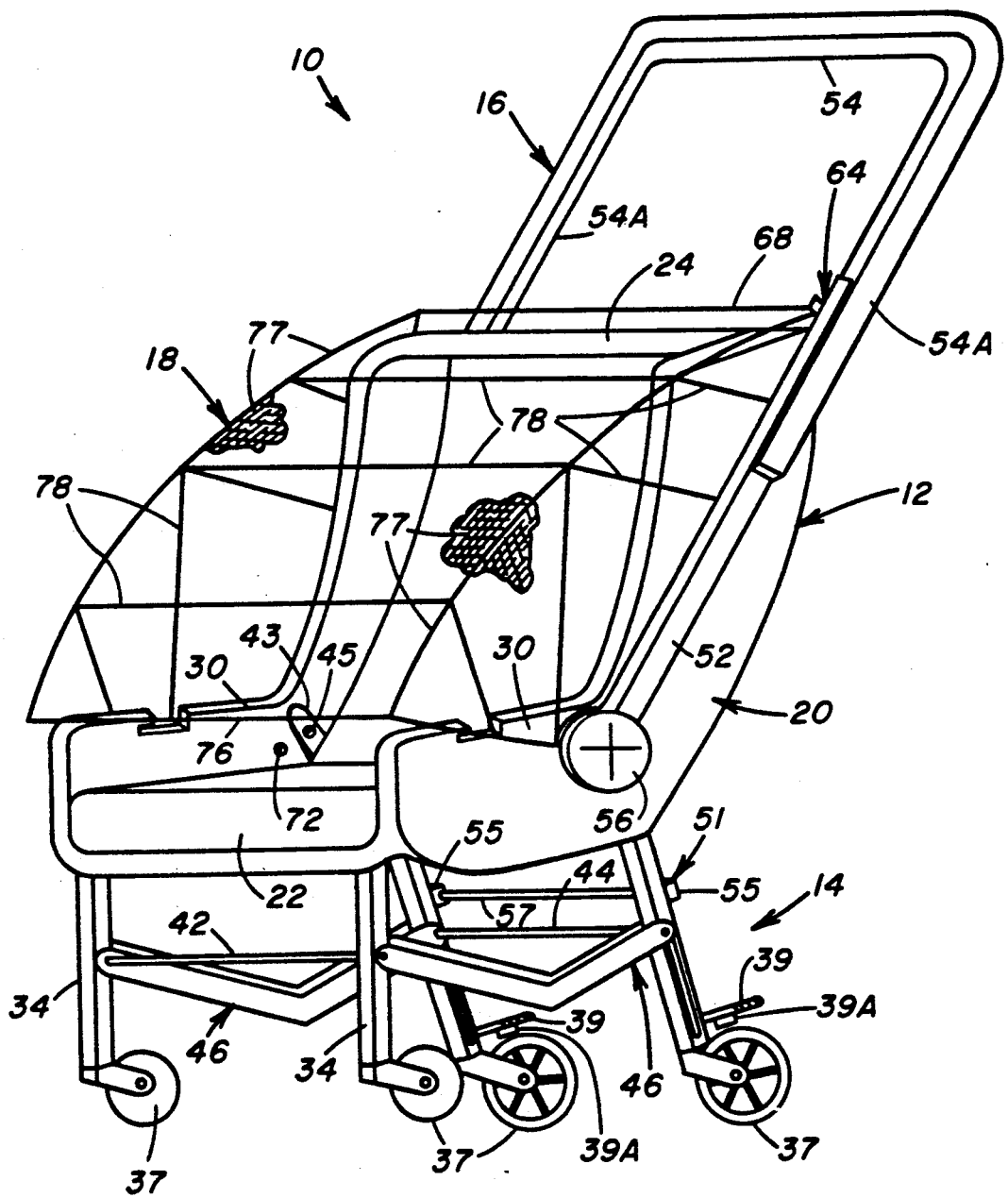
FIG. 1 is a perspective view of a general utility child seat apparatus of the present invention showing the apparatus converted for use as a stroller.

Referring to the drawings, and particularly to FIG. 1, there is illustrated a general utility child seat apparatus, generally designated 10, constructed in accordance with the principles of the present invention. The child seat apparatus 10 of the present invention employs a one-piece contoured child car seat 12, being conventional per se, and incorporates a mobile carriage assembly 14, a handle assembly 16, and a sunshade assembly 18 in conjunction with the child car seat 12 to adapt the child seat apparatus 10 for multiple uses, such as for use as a stroller, carrier or rocker, in addition to a car seat.

Basically, the child seat 12 of the apparatus 10 is a child seat body 20 having a seat portion 22 and back portion 24 integrally formed in an inclined relation to the seat portion 22. The child seat body 20 preferably is a one-piece rigid molded plastic structure contoured into the shape of a car seat and has bottom and rear recesses 26, 28 (FIG. 4). The child seat body 20 also has arm rest portions 30 integrally formed with the opposite sides of the seat and back portions 22, 24 and projecting forwardly therefrom. The mobile carriage assembly 14 is mounted in the bottom recess 26 to a rear side of the child seat body 20 and is capable of adjustment between an erected condition (FIGS. 1 and 2) for movably supporting the child seat body 20 and a collapsed condition (FIG. 3) for storing on the body 20 within its bottom and rear recesses 26, 28 (FIG. 4). The handle assembly 16 and sunshade assembly 18 are pivotally attached to the opposite exterior sides of the arm rest portions 30 of the child seat body 20. The handle assembly 16 and sunshade assembly 18 have inverted U-shaped configurations for permitting them to arch over the seat and back portions 22, 24 of the child seat body 20.

Referring to FIGS. 1-4, the mobile carriage assembly 14 of the child seat apparatus 10 includes a base 32, a pair of front legs 34, a pair of rear legs 36, and a plurality of rotatable wheels 37 mounted on the lower ends of the front and rear legs 34, 36. Preferably, the rear wheels 37 are larger in diameter than the front wheels 37. Also, locking pedals 39 are pivotally mounted to the lower ends of the rear legs 36 and extend rearwardly above the rear wheels 37. Each pedal 39 has a pair of downwardly-projecting, laterally-spaced, semi-rigid flexible tabs 39A which will frictionally interfit with the top of the one rear wheel 37 when the pedal 29 is pressed downward toward the wheel. In such manner, the pedals 39 are operable to hold and lock the rear wheels 37 against rotation. The wheels 37 are released from the lock condition by merely lifting up on the pedals 39.

The base 32 of the carriage assembly 14 is stationarily mounted to a rear side of the seat portion of the body. The base 32 is a rigid generally U-shaped structure composed of a pair of laterally spaced side members 38 and a front member 40 extending between and rigidly interconnecting the side members 38. The upper ends of the front legs 34 are pivotally attached to front ends of the side members 38 of the base 32, while the upper ends of the rear legs 36 are pivotally attached to rear ends of the side members 38 of the base 32. The front member 40 of the base 32 is secured by fasteners 41 to the bottom front of the seat portion 22 of the child seat body 20. The side members 38 are supported from the arm rest portions of the child seat body 20 by right angle brackets 43 (FIGS. 1-3) attached to rear ends of the side members and attached by fasteners 45 (FIG. 1) to the inside surface of the arm rest portions 30.

The mobile carriage assembly 14 also includes a front and rear transverse members in the form of front and rear tie rods 42, 44. The front tie rod 42 extends between and connects with intermediate locations on the front legs 34 for causing the front legs 34 to pivot together in unison between erected and collapsed positions relative to the base, as respectively shown in FIGS. 2 and 3. The rear tie rod 44 extends between and connects with intermediate locations on the rear legs 36 (via short slots 43 defined through the rear legs) for causing the rear legs 36 to pivot together in unison between erected and collapsed positions relative to the base 32, as shown respectively in FIGS. 2 and 3.

The mobile carriage assembly 14 also includes right and left longitudinal bifurcated members 46 pivotally interconnecting the respective front and rear legs 34, 36 disposed along respective opposite sides of the base 32. The right and left longitudinal members 46 cause the front and rear legs 34, 36 to pivot together in unison between erected and collapsed positions relative to the base 32, as shown respectively in FIGS. 2 and 3. The first and second longitudinal members 46 are shown with shallow V-shaped configurations; however, they can just as readily have other configurations, such as curved or arcuate. The longitudinal members 46 extend substantially parallel to one another and are spaced apart laterally from one another. The bifurcated longitudinal members 46 receive in nesting relation the lower ends of the front legs 34 and the wheels 37 mounted thereon when the front and rear legs 34, 36 are pivoted to the collapsed position, as shown in FIGS. 3 and 4. The side members 38 of the base 32 have slots 50 through which the wheels 37 on the front legs 34 extend when the front and rear legs 34, 36 are pivoted to the collapsed position. As seen in FIG. 4, the carriage assembly 14 is retained in the collapsed condition by a retention clip member 47 attached to the underside of the back portion 24 of the child seat body 20 in a position to releasably interfit with the rear tie rod 42 of the carriage assembly 14.

Figure 5:
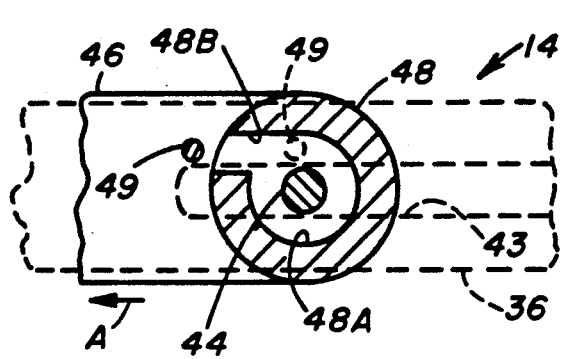
FIG. 5 is an enlarged fragmentary longitudinal sectional view taken along line 5—5 of FIG. 3, showing an unlocked relationship between one of the rear legs and a corresponding one of the longitudinal members of the carriage assembly.
Figure 6:
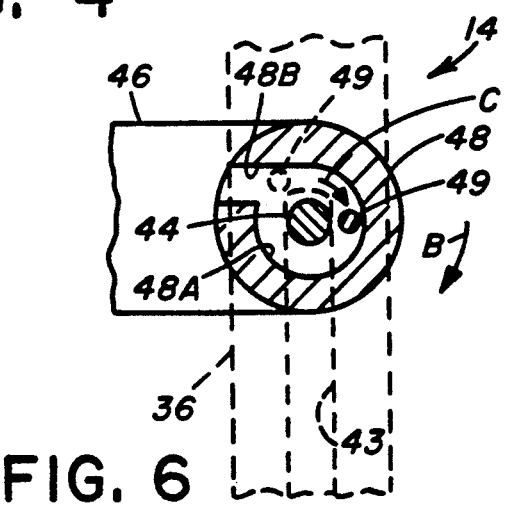
FIG. 6 is a view similar to that of FIG. 5, but showing a locked relationship between the one rear leg and longitudinal member of the carriage assembly.
Figure 8:
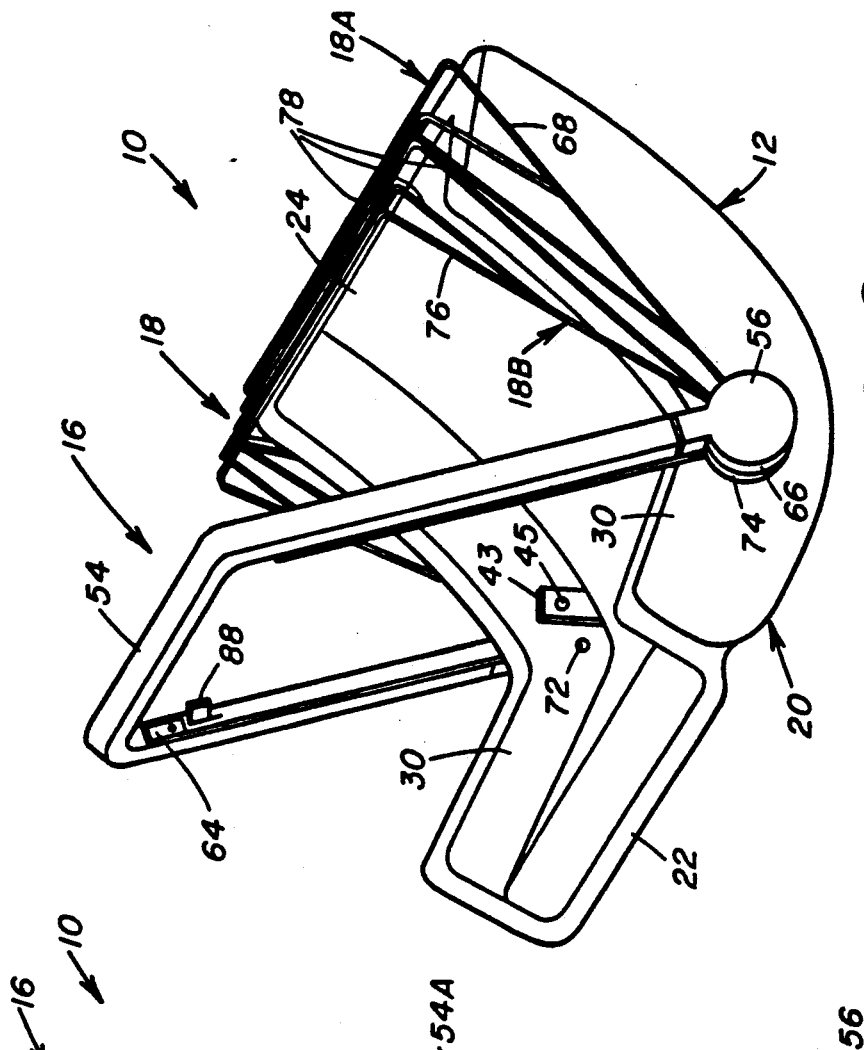
FIG. 8 is a perspective view of the child seat apparatus of the present invention showing the apparatus converted for use as a carrier or rocker.
Figure 9:
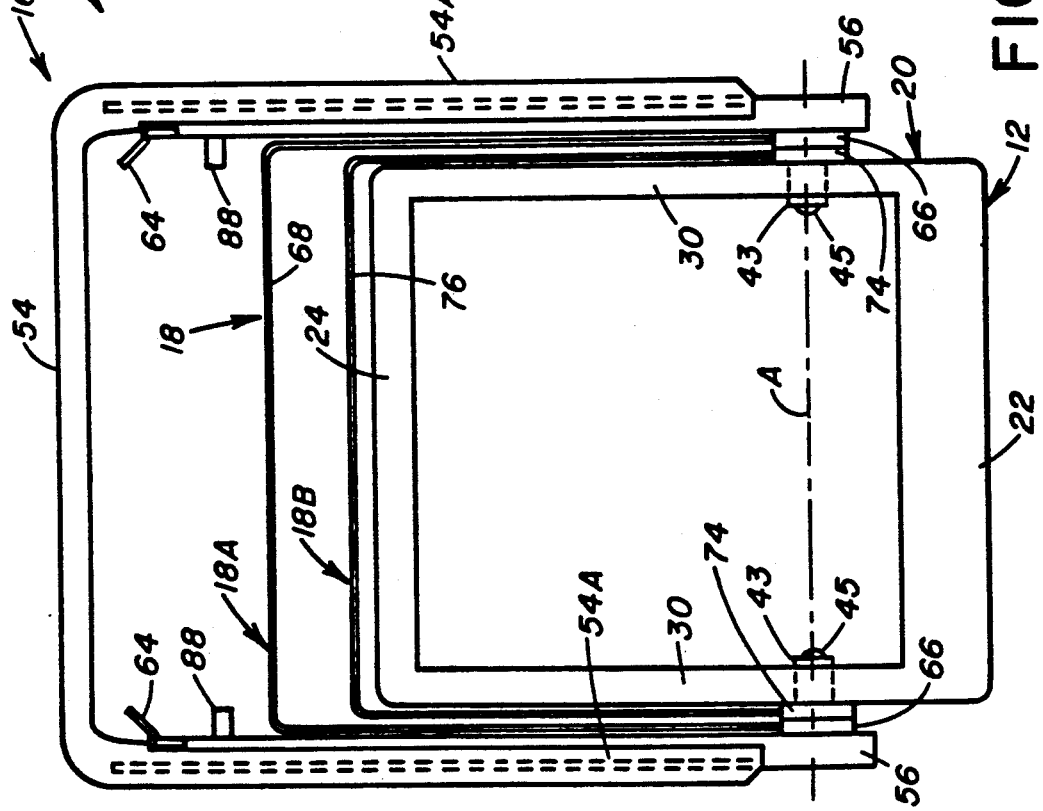
FIG. 9 is an enlarged front elevational view of the child seat apparatus of FIG. 8.
Figure 11:
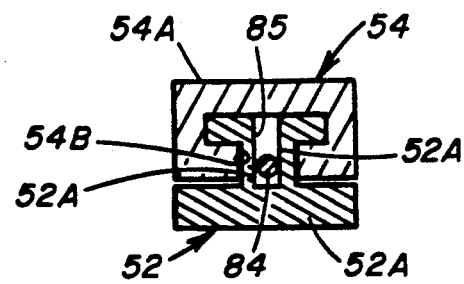
FIG. 11 is an enlarged cross-sectional view of the handle assembly taken along line 11—11 of FIG. 10.
Figure 12:
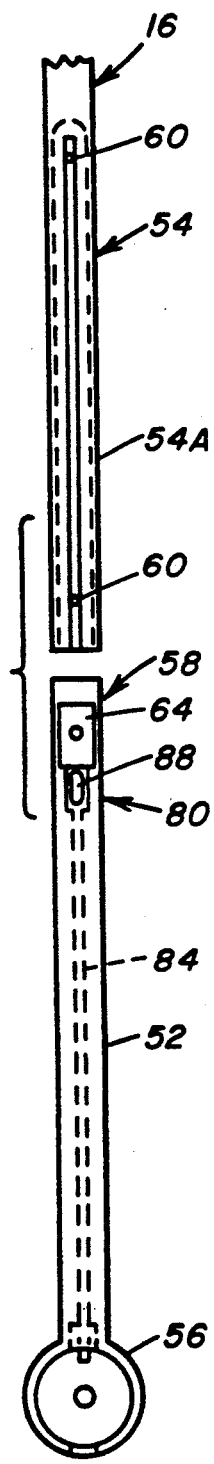
FIG. 12 is a fragmentary exploded view of the handle assembly as seen along line 12—12 of FIG. 10.
Figure 10:
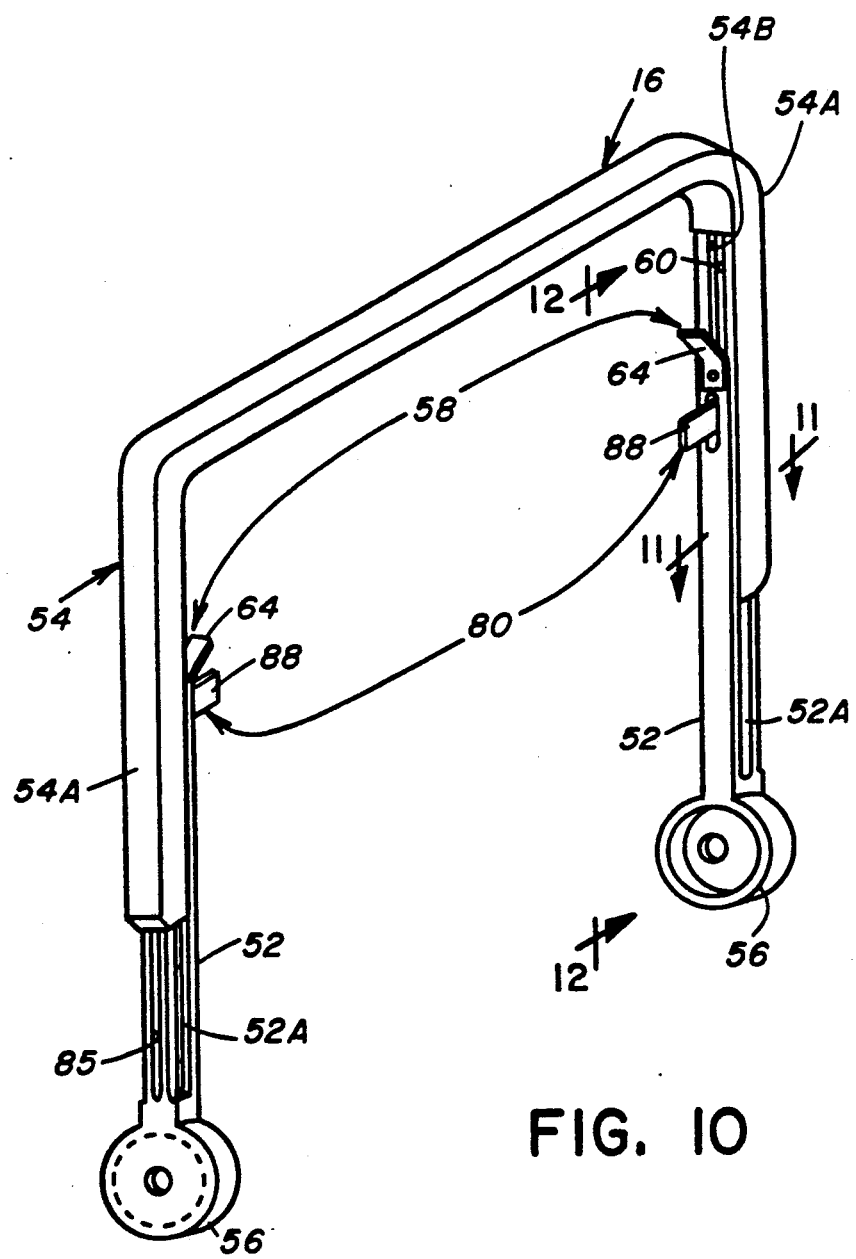
FIG. 10 is an enlarged perspective view of a handle assembly of the child seat apparatus of FIG. 8, showing the handle assembly by itself.

In the collapsed condition of the carriage assembly 14 shown in FIG. 3, the rear legs 36 are in collapsed positions relative to the rear ends of the longitudinal members 46. To convert the carriage assembly 14 to its erected condition shown in FIG. 2, the rear legs 34, 36 are pivotally moved to erected positions relative to the first and longitudinal members 40, 46. After moving the carriage assembly 14 to its erected condition, the rear legs 36 in some manner must be maintained at their extended positions shown in FIGS. 1 and 2. Referring to FIGS. 5 and 6, there is shown one of a pair of cam lock elements 48 disposed on opposite sides of each of the respective rear legs 36 by being attached to the rear ends of the bifurcated longitudinal members 46 and mounted to the opposite ends of the rear tie rod 44. The cam lock elements 48 are fixed to the longitudinal members 38 such that the rear legs 36 will rotate relative to them in pivoting from parallel to transverse orientations relative to the longitudinal members 46 in converting the carriage assembly 14 from the collapsed to erected condition. Due to the mounting of the rear tie rod 44 through the slots 43 in the rear legs 36, the rear tie rod 44, rear ends of the longitudinal members 46 and the cam lock elements 48 are permitted to slidably move along the rear legs 36. Each of the cam lock elements 48 has a circular groove 48A with a tangential entrance 48B through which a protuberance 49 fixed on each opposite side of each rear leg 36, as shown in FIG. 5, will be received into the circular groove 48A as each of the longitudinal members 46 is pulled in the direction of arrow A releative to the rear leg 36 upon initiating pivotal movement of each front leg 34 from the collapsed position of FIG. 3 toward the erected position of FIG. 2, but before pivoting of each rear leg 36 from the collapsed position of FIG. 3 toward the erected position of FIG. 2. Then, when the rear leg 36 is rotated approximately ninety degrees in the direction of arrow B during erecting the carriage assembly 14, the protuberance 49 is moved around the circular groove 48A, in the direction of arrow C, becoming displaced out of alignment with the tangential entrance 48B of the cam lock element groove 48A so as to lock the rear leg 36 at the erected position shown in FIG. 2 and thus prevent it from being retracted relative to the longitudinal member 46. Only by reverse rotation of the front and rear leg 34, 36 back to the parallel relation with the longitudinal member 46 can the cam lock elements 48 on the rear ends of the longitudinal members 46 become retracted from the protuberances on the rear legs 36 upon the conclusion of movement of the front legs 34 to their collapsed positions shown in FIG. 3.

Figure 2:
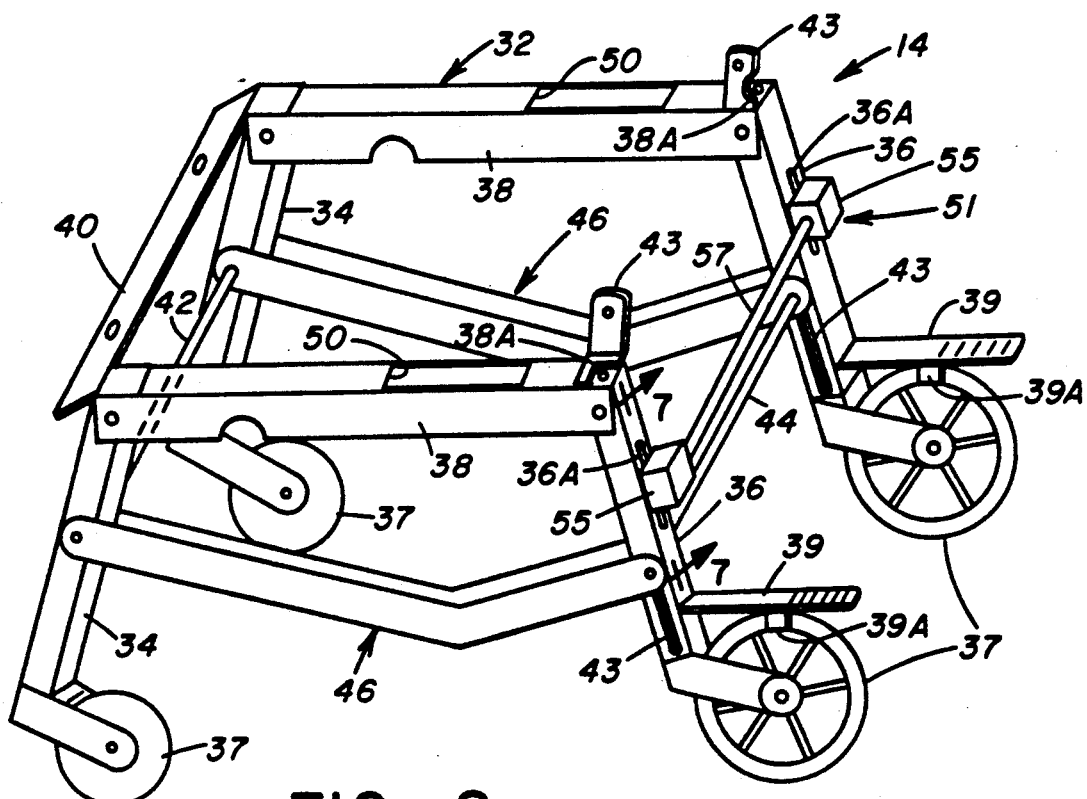
FIG. 2 is an enlarged perspective view of a mobile carriage assembly of the child seat apparatus of FIG. 1, showing the carriage assembly by itself in an erected condition.
Figure 3:
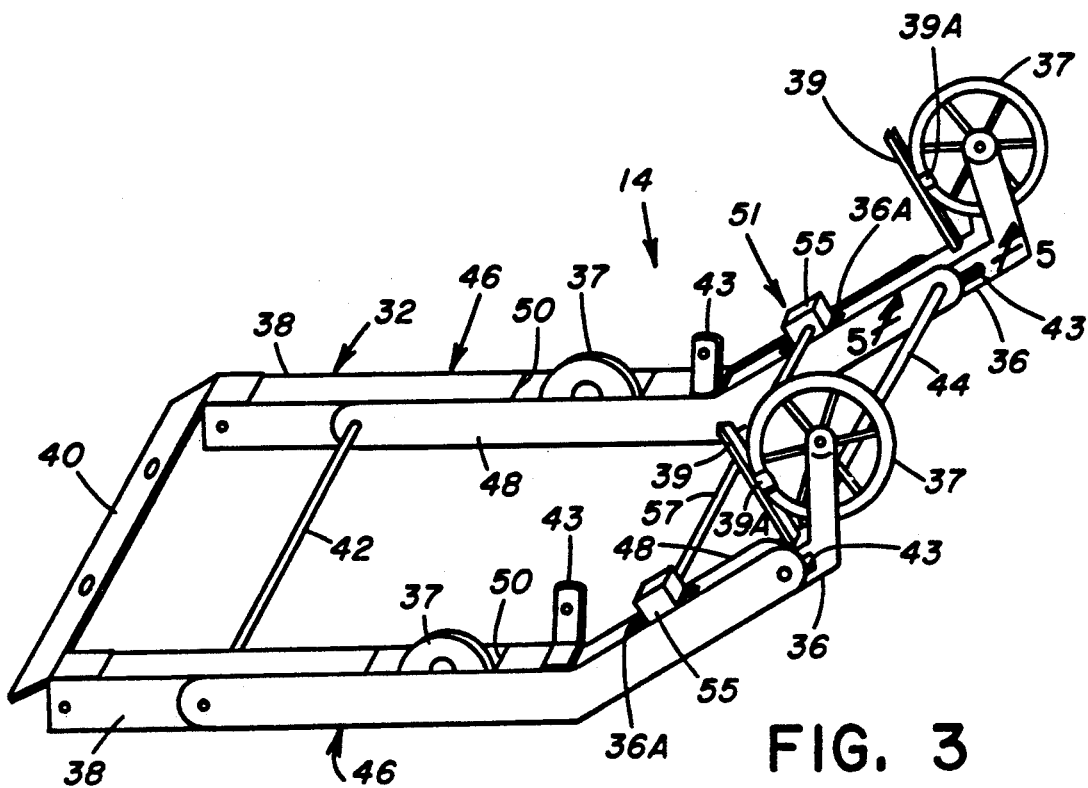
FIG. 3 is an enlarged perspective view of the mobile carriage assembly of the child seat apparatus of FIG. 1, showing the carriage assembly by itself in a collapsed condition.
Figure 4:
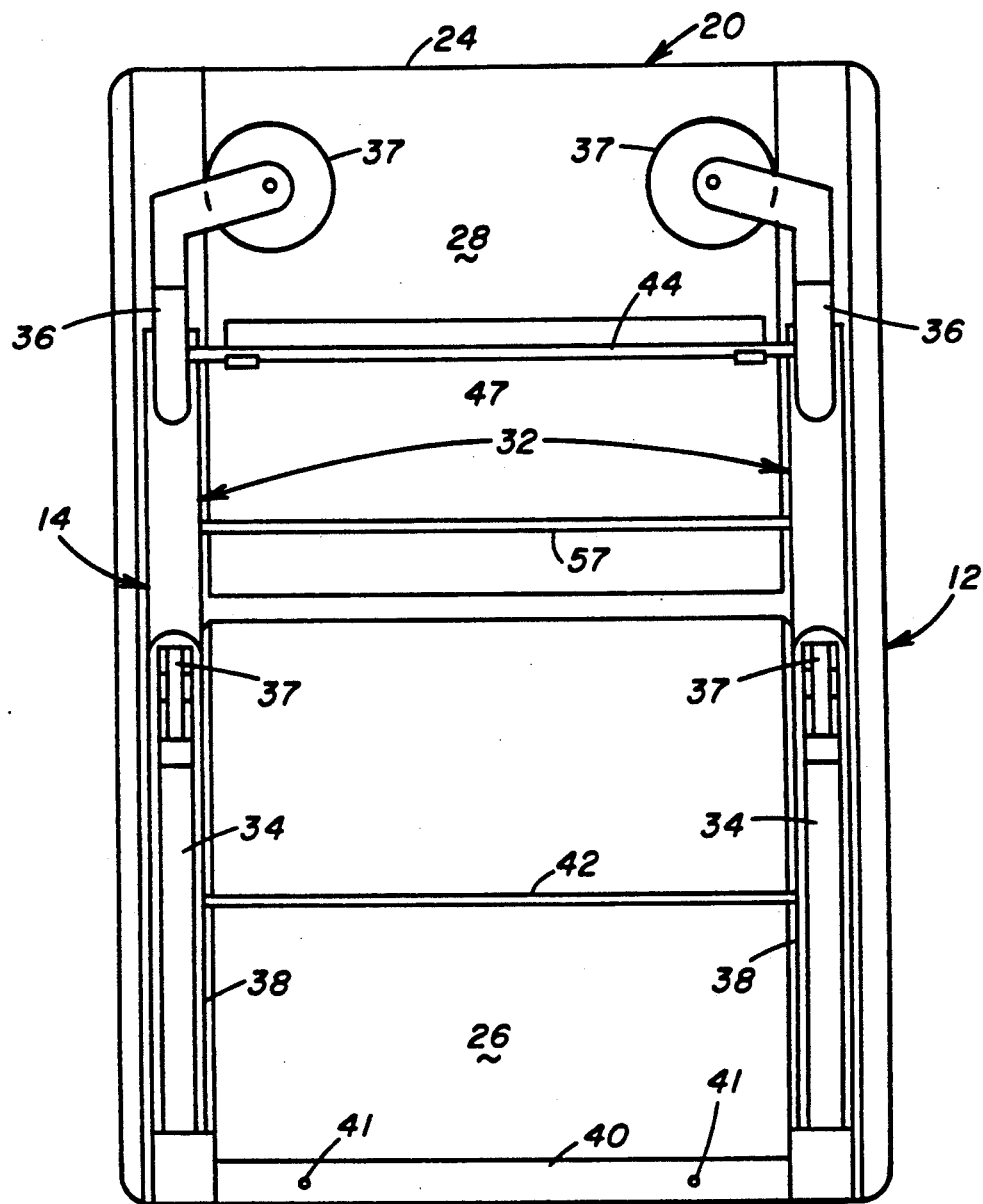
FIG. 4 is an enlarged rear elevational view of child seat apparatus showing the mobile carriage assembly in the collapsed condition and stored in rear and bottom recesses in the one-piece contoured car seat of FIG. 1.

Referring to FIGS. 1-3 and 7, a latch mechanism 51 is shown mounted on the rear legs 36 for latching and retaining the rear legs 36 in the substantially transverse or perpendicular transverse relation to the side members 38 when the carriage assembly 14 is at its erected position seen in FIGS. 1 and 2. The latch mechanism 51 includes an elongated latch pin 53 disposed in each rear leg 36 and rigidly mounted to a slider element 55 which is slidably moveable along the rear leg 36 toward and away from the upper end thereof. A portion 55A of each slider element 55 protrudes from each rear leg 36 through a longitudinal slot 36A defined along the rear middle side of the rear leg 36. The protruding portions 55A of the slider elements 55 are rigidly interconnected by an elongated bar 57 which can be gripped to facilitate slidably moving the slider elements 55 at the same time.

In the latched position shown in FIG. 7, the free ends 53A of the latch pins 53 extend through aligned holes 36B and 38A respective formed in the upper ends of the rear legs 36 and in the rear ends of the base side members 38. A coil spring 59 is provided in each rear leg 36 between the slider element 55 and a block 36C secured in the leg 36 below the slider element 55. The coil springs 59 normally urge and hold the latch pins 53 in the latched position when the holes 36B and 38A are aligned as when the rear legs 36 are disposed in the erected positions shown in FIGS. 1, 2 and 7.

By pulling downwardly on the bar 57 the slider elements 55 will compress the coil springs 59 and withdraw to unlatched positions in which the free ends 53A of the latch pins 53 are retracted from the holes 38A in the side members 38. The rear legs 36 can then be rotated relative to the side members 38 of the base 32 for converting the carriage assembly 14 from the erected to collapsed conditions.

Referring to FIGS. 1 and 8–13, the handle assembly 16 of the child seat apparatus 10 includes a pair of inner members 52 of substantially straight configurations and an outer member 54 of an inverted U-shaped configuration. The inner members 52 have circular hubs 56 at their inner ends by which they are pivotally attached, in a manner to be described later, to the exterior of the arm rest portions 30 at the opposite sides of the child seat body 20. The outer member 54 has a pair of arm portions 54A with an interior longitudinal groove 54B of T-shaped cross-section which intermeshes with complementary exterior longitudinal grooves 52A on opposite sides of the inner members 52 such that the arm portions 54A of the outer member 54 are slidably engaged with and movable along the inner members 52. Thus, in such manner the outer member 54 is longitudinally extendible and retractible relative to the inner members 52. Due to its overall inverted U-shaped configuration, the handle assembly 16 can arch over the seat and back portions 22, 24 of the child seat body 20 as the handle assembly 16 is pivoted through an arcuate path relative to the body 20.

The handle assembly 16 also includes means 58 for releasably locking the outer member 54 to the inner members 52 in any one of a number of longitudinally displaced positions relative to the inner members 52 to adjust the desired length of the handle assembly 16. The releasable locking means 58 includes a plurality of detents 60 formed in the opposite arm portions of the outer member 54. The spaced detents 60 define the longitudinally displaced positions of the outer member 54 relative to the inner members 52. The releasable locking means 58 also includes plungers 62 extending in transverse relation to the respective inner members 52, and shallow V-shaped levers 64 pivotally mounted adjacent to the upper ends of the respective inner members 52. The levers 64 are actuatable for reciprocally moving the plungers 62 toward and away from the detents 60 in the arm portions 54A of the outer member 54 to engage with and disengage from any one of the detents 60 for releasing and retaining the outer member 54 of the handle assembly 16 at a desired one of the longitudinally displaced positions. The plungers 62 are loaded by coil springs (not shown) for biased movement toward and engagement with the desired one of the detents 60.

Referring to FIGS. 1, 8, 9 and 13, the sunshade assembly 18 of the child seat apparatus 10 is pivotally mounted at opposite sides of the child seat body 20 about a common axis A with the handle assembly 16 and between the handle assembly 16 and the opposite sides of the body 20. The sunshade assembly 18 includes a rear portion 18A and a front portion 18B. The rear portion 18A is composed of a pair of first hubs 66 and an inverted U-shaped rear bow 68 attached at its opposite ends to the first hubs 66. The first hubs 66 project through holes 70 in the arm rest portions 30 of the child seat body and are stationarily mounted on the opposite exterior sides of the arm rest portions 30 by fasteners 72. The front portion 18B is composed of a pair of second hubs 74 and an inverted U-shaped front bow 76 attached at its opposite ends to the second hubs 74. The second hubs 74 have central bores 74A for receiving axial portions of the first hubs 66 to thereby install the second hubs 74 in rotatably mounted relationship upon the first hubs 66. Thus, the front bow 76 will pivotally move toward and away from the rear bow 68 upon rotation of the second hubs 74 in opposite directions relative to the first hubs 66. The front bow 76 can be placed at any angular position relative to the rear bow 68 due the frictional contact between the first and second hubs 74.

The sunshade assembly 18 further includes a canopy 77 (only partially shown in FIG. 1) of a suitable flexible material, such as a synthetic cloth, extending between, overlying, and attached to, the rear and front bows 68, 76, and a series of bow segments 78 attached to the canopy 77 at transverse locations thereon spaced from one another and located between the rear and front bows 68, 76. The flexible canopy 77 and bow segments 78 can be deployed in an expanded condition (FIG. 1) for providing full coverage of the child seat body 20 by pivoting the front bow 76 away from the rear bow 68 to a position remote from the rear bow. The flexible canopy 77 and bow segments 78 can be deployed in a contracted condition (FIG. 8) for storing the sunshade assembly 18 by pivoting the front bow 76 toward the rear bow 68 to a position adjacent to the rear bow 68.

The handle assembly 16 of the child seat apparatus 10 also includes means 80 for releasably retaining the inner members 52 of the handle assembly 16 in any one of a number of angular positions relative to arm rest portions 30 of the child seat body 20. The releasable retaining means 80 includes a plurality of detents 82 formed in the first hubs 66 of the sunshade assembly 18 which define the spaced apart angular positions of the handle assembly 16. The releasable retaining means 80 also includes an elongated plunger 84 mounted along and within the interior of a channel 85 defined in each of the inner members 52 of the handle assembly 16 for reciprocal movement toward and away from the first hubs 66 to engage with and disengage from any one of the detents 82 defined therein for releasing and retaining the handle assembly at a desired one of the angular positions. The plungers 84 are loaded by springs 86 for biased engagement with the detents 82 and have finger grips 88 on their upper ends for grasping to pull the plungers 84 away from the detents 82 to change the angular position of the handle assembly 16.

To summarize, the mobile carriage assembly 14 is preferably mounted to the underside of the child seat body 20 and when collapsed will nest and store within the recesses 26, 28 formed in the underside of the seat body. Alternatively, the carriage assembly 14 can be designed to collapse alongside the exterior of the side of the child seat body 20. The combination of the handle assembly 16, car seat 12, and mobile carriage assembly 14 adapts the child seat apparatus 10 to be used as a mobile child stroller (FIG. 1) for an adult to push with the handle assembly 16 locked as the child is seated in the contoured seat 12.

The pivotally adjustable and longitudinally extendible and retractible handle assembly 16 is pivotally mounted at opposite sides of the child seat body 20. The handle assembly 16 is indexable to multiple locked angular positions relative to the child seat body 20. The combination of the handle assembly 16 and the child seat body 20 adapts the child seat apparatus 10 to be used as a portable child carrier (FIG. 8) for an adult to tote with the handle assembly 16 locked as the child is seated in the contoured seat 12 or to be used as a stationary child rocker (also FIG. 8) which can be rocked while resting on the floor by pushing on the locked handle assembly 16.

The expandable and contractable sunshade assembly 18 is pivotally mounted at the opposite sides of the child seat body 20 inside of the handle assembly 16. The sunshade assembly 18 can be deployed in the expanded condition (FIG. 1) for providing full coverage of a child in the contoured seat 12 as the child seat apparatus 10 is being used as either a car seat, carrier, rocker, or stroller.

It is thought that the present invention and its advantages will be understood from the foregoing description and it will be apparent that various changes may be made thereto without departing from its spirit and scope of the invention or sacrificing all of its spirit material advantages, the form hereinbefore described being merely preferred or exemplary embodiment thereof.

Having thus described the invention, what is claimed is:

1. A general utility child seat apparatus, comprising:
   (a) a child seat body having a seat portion and back portion integrally formed in an inclined relation to said seat portion;
   (b) a mobile carriage assembly mounted to said child seat body for movement between erected and collapsed conditions, said carriage assembly having a base stationarily mounted to said child seat body, front legs pivotally attached at upper ends to laterally-spaced locations on a front end of said base, rear legs pivotally attached at upper ends to laterally-spaced locations on a rear end of said base, a plurality of rotatable wheels respectively mounted to lower ends of said legs, a front transverse member extending between and interconnecting said front, a rear transverse member extending between and interconnecting said rear legs, and first and second longitudinal members extending between and pivotally connected with said respective front and rear legs and being disposed along respective opposite sides of said base so as to cause said front and rear legs to pivot together in unison between erected and collapsed positions relative to said base to move said carriage assembly between said erected and collapsed conditions; and
   (c) a handle assembly attached to opposite sides of said child seat body;
   (d) said base of said carriage assembly including a pair of laterally spaced side members and a front member extending between and rigidly interconnecting said side members, said side members and said front member being attached to said seat body, said front and rear legs being pivotally attached to respective opposite ends of said side members of said base.

2. The apparatus of claim 1 wherein said carriage assembly also includes a latch mechanism mounted to said rear legs and being operable for releasably latching said rear legs in said erected position relative to said base.

3. The apparatus of claim 1 wherein said child seat body has arm rest portions integrally formed with opposite sides of and projecting outwardly from said seat and back portions, said handle assembly being pivotally mounted to the exterior sides of said arm rest portions.

4. The apparatus of claim 1 wherein said handle assembly has an inverted U-shaped configuration for permitting said handle assembly to arch over said seat and back portions of said child seat body.

5. The apparatus of claim 1 wherein said front transverse member of said mobile carriage assembly is a tie rod extending between and interconnecting said pair of front legs at locations intermediate of said upper and lower ends of said front legs.

6. The apparatus of claim 1 wherein said rear transverse member of said mobile carriage assembly is a tie rod extending between and interconnecting said pair of rear legs at locations intermediate of said upper and lower ends of said rear legs.

7. A general utility child seat apparatus, comprising:
   (a) a child seat body having a seat portion and back portion integrally formed in an inclined relation to said seat portion;
   (b) a mobile carriage assembly mounted to said child seat body, said carriage assembly capable of adjustment between an erected condition for movably supporting said child seat body and a collapsed condition for storing on said child seat body;
   (c) a handle assembly having a pair of inner members pivotally attached at inner ends to opposite sides of said child seat body, an outer member of an inverted U-shaped configuration slidably connected to said inner members such that said outer member is longitudinally extendible and retractible relative to said inner members and said handle assembly can arch over said seat and back portions of said child seat body, and means for releasably retaining said inner members in any one of a plurality of angular positions relative to said sides of said child seat body; and
   (d) means for releasably locking said outer member of said handle assembly to said inner members of said handle assembly in any one of a plurality of longitudinally displaced positions relative to said inner members to adjust the desired length of said handle assembly, said releasable locking means including
      (i) a plurality of detents contained on opposite arms of said outer member for defining said plurality of longitudinally displaced positions of said outer member relative to said inner members, and
      (ii) an elongated plunger mounted in transverse relation to each of said inner members of said handle assembly for reciprocal movement toward and away from said detents in said opposite arms of said outer member to engage with and disengage from any of said detents defined therein for releasing and retaining said outer member of said handle assembly at a desired one of said longitudinally displaced positions.

8. The apparatus of claim 7 wherein said releasable retaining means includes:
   means defining a hub at each of said opposite sides of said child seat body, said hub containing a plurality of detents defining said plurality of angular positions; and
   an elongated plunger mounted along and in each of said inner members of said handle assembly for reciprocal movement toward and away from said hub to engage with and disengage from any of said detents defined therein for releasing and retaining said handle assembly at a desired one of said angular positions.

9. The apparatus of claim 7 wherein said mobile carriage assembly includes:
   a base stationarily mounted to said child seat body;
   a pair of front legs pivotally attached at upper ends to laterally-spaced locations on a front end of said base;
   a pair of rear legs pivotally attached at upper ends to laterally-spaced locations on a rear end of said base; and
   a plurality of rotatable wheels respectively mounted to lower ends of said legs.

10. The apparatus of claim 9 wherein said mobile carriage assembly also includes:
    a front transverse member interconnecting said front legs for causing said front legs to pivot in unison between erected and collapsed positions relative to said base upon adjustment of said carriage assembly between said erected and collapsed conditions; and
    a rear transverse member interconnecting said rear legs for causing said rear legs to pivot in unison between erected and collapsed positions relative to said base upon adjustment of said carriage assembly between said erected and collapsed conditions.

11. The apparatus of claim 10 wherein said mobile carriage assembly further includes first and second longitudinal members pivotally connecting said respective front and rear legs disposed along respective opposite sides of said base for causing said front and rear legs to pivot in unison between erected and collapsed positions relative to said base.

12. A general utility child seat apparatus, comprising:
    (a) a child seat body having a seat portion and back portion integrally formed in an inclined realtion to said seat portion;
    (b) a mobile carriage assembly mounted to said child seat body, said carriage assembly capable of adjustment between an erected condition for movably supporting said child seat body and a collapsed condition for storage on said body;
    (c) a handle assembly pivotally mounted at opposite sides of said child seat body; and
    (d) a sunshade assembly pivotally mounted at opposite sides of said child seat body about a common axis with said handle assembly and between said handle assembly and said opposite sides of said body, said sunshade including
       (i) a rear portion having a pair of first hubs mounted stationarily to said opposite sides of said child seat body and a generally U-shaped rear bow attached at opposite ends to said first hubs,
       (ii) a front portion having a pair of second hubs rotatably mounted to said first hubs and a generally U-shaped front bow attached at opposite ends to said second hubs for pivotal movement relative to said rear bow upon rotation of said second hubs relative to said first hubs,
       (iii) a canopy of flexible material overlying and attached to said rear and front bows, and
       (iv) a series of bow segments disposed between said rear and front bows and attached to said canopy, said canopy and bow segments being deployable in an expanded condition for providing coverage of said child seat body when said front bow is pivoted away from said rear bow and in a contracted condition for storing said sunshade when said front bow is pivoted toward said rear bow.

13. The apparatus of claim 12 further comprising:
    means for releasably retaining said handle assembly in any one of a plurality of angular positions relative to said sides of said child seat body, said releasable retaining means including a plurality of detents formed in said first hubs defining said plurality of angular positions and means mounted along said handle assembly for reciprocal movement toward and away from said first hubs to engage with and disengage from any of said detents defined therein for releasing and retaining said handle assembly at a desired one of said angular positions.

14. A general utility child seat apparatus, comprising:
    (a) a child seat body having a seat portion and back portion integrally formed in an inclined relation to said seat portion;
    (b) a mobile carriage assembly mounted to said child seat body for movement between erected and collapsed conditions, said carriage assembly having a base stationarily mounted to said child seat body, front legs pivotally attached at upper ends to laterally-spaced locations on a front end of said base, rear legs pivotally attached at upper ends to laterally-spaced locations on a rear end of said base, a plurality of rotatable wheels respectively mounted to lower ends of said legs, a front transverse member extending between and interconnecting said front legs, a rear transverse member extending between and interconnecting said rear legs, and first and second longitudinal members extending between and pivotally connected with said respective front and rear legs and being disposed along respective opposite sides of said base so as to cause said front and rear legs to pivot together in unison between erected and collapsed positions relative to said base to move said carriage assembly between said erected and collapsed conditions, said rear legs having slots defined therein and said longitudinal members having rear ends connected via said slots to said rear legs so as to be slidably movable relative to said rear legs upon initiating pivotal movement of said front legs away from said collapsed positions and toward said erected positions; and
    (c) a handle assembly attached to opposite sides of said child seat body;
    (d) said carriage assembly also having cam lock elements mounted on said rear ends of said longitudinal members and protuberances disposed on said rear legs, each of said cam lock elements having has a circular groove with a tangential entrance through which said protuberance is received from an unlocking position as each of said front legs is moved from said collapsed to erected position but before pivoting of said rear leg from said collapsed to erected position, such that thereafter said protuberance is moved about said circular groove to a locking position as said rear leg is pivoted from said collapsed to erected position so as to thereafter prevent movement of said rear leg from said extended to retracted position.

15. A general utility child seat apparatus, comprising:
(a) a child seat body having a seat portion and back portion integrally formed in an inclined relation to said seat portion;
(b) a mobile carriage assembly mounted to said child seat body for movement between erected and collapsed conditions, said carriage assembly having a base stationarily mounted to said child seat body, front legs pivotally attached at upper ends to laterally-spaced locations on a front end of said base, rear legs pivotally attached at upper ends to laterally-spaced locations on a rear end of said base, a plurality of rotatable wheels respectively mounted to lower ends of said legs, a front transverse member extending between and interconnecting said front legs, a rear transverse member extending between and interconnecting said rear legs, and first and second longitudinal members extending between and pivotally connected with said respective front and rear legs and being disposed along respective opposite sides of said base so as to cause said front and rear legs to pivot together in unison between erected and collapsed positions relative to said base to move said carriage assembly between said erected and collapsed conditions, each of said first and second longitudinal members extending parallel to and are spaced apart from one another and being bifurcated for receiving in nested relation said lower ends of said front legs and said wheels mounted thereon when said front and rear legs are pivoted to said collapsed positions; and
(c) a handle assembly attached to opposite sides of said child seat body.

* * * * *